(12) United States Patent
Lin et al.

(10) Patent No.: US 8,767,417 B2
(45) Date of Patent: Jul. 1, 2014

(54) DUAL SWITCHES FLYBACK POWER CONVERTER WITH WIDE INPUT VOLTAGE RANGE

(75) Inventors: Chao-Chih Lin, Taoyuan County (TW); Ta-Yung Yang, Milpitas, CA (US); Ying-Chieh Su, Taipei County (TW)

(73) Assignee: System General Corp., Taipe Hsien (TW)

( * ) Notice: Subject to any disclaimer, the term of this patent is extended or adjusted under 35 U.S.C. 154(b) by 288 days.

(21) Appl. No.: 13/099,595

(22) Filed: May 3, 2011

(65) Prior Publication Data

US 2011/0317454 A1 Dec. 29, 2011

Related U.S. Application Data

(60) Provisional application No. 61/353,776, filed on Jun. 25, 2010.

(51) Int. Cl.
*H02M 3/335* (2006.01)
(52) U.S. Cl.
USPC .................................................... 363/21.12
(58) Field of Classification Search
USPC ......... 363/21.01–21.08, 21.12–21.16, 15–17, 363/25, 39, 40, 98, 132
See application file for complete search history.

(56) References Cited

U.S. PATENT DOCUMENTS

| 4,417,153 | A  | * | 11/1983 | Onodera et al. | ............... | 307/140 |
| 7,061,776 | B2 | * | 6/2006  | Yang et al.    | ............... | 363/16  |
| 7,426,120 | B2 |   | 9/2008  | Yang et al.    |                |         |
| 7,460,380 | B2 | * | 12/2008 | Yang           | ............... | 363/131 |

OTHER PUBLICATIONS

A Topology Survey of Single-Stage PFC with a Boost Type Input-Current-Shaper; Qiao et al.; IEEE-2000.*

* cited by examiner

*Primary Examiner* — Adolf Berhane
*Assistant Examiner* — Yemane Mehari
(74) *Attorney, Agent, or Firm* — Rosenberg, Klein & Lee

(57) ABSTRACT

A dual switches Flyback power converter with a wide input voltage range according to the present invention comprises an input diode and an energy-storage capacitor. The input diode can prevent the reflected voltage from the power transformer of the power converter to charge the electrolytic capacitor of the power converter. The energy-storage capacitor will store the reflected voltage and the energy of the leakage inductor of the power transformer. The energy stored in the energy-storage capacitor will be recycled to the output voltage of the power converter. Further, the input diode can be replaced by an input transistor to prevent the reflected voltage from the power transformer to charge the electrolytic capacitor.

20 Claims, 3 Drawing Sheets

US 8,767,417 B2

DUAL SWITCHES FLYBACK POWER CONVERTER WITH WIDE INPUT VOLTAGE RANGE

REFERENCE TO RELATED APPLICATIONS

This Application is based on Provisional Patent Application Ser. No. 61/353,776, filed 25 Jun. 2010.

FIELD OF THE INVENTION

The present invention relates to a dual switches power converter, more particularly, relates to a dual switches Flyback power converter characterized in wide input voltage range.

BACKGROUND OF THE INVENTION

The quasi-resonant operation is one of the soft-switching techniques. In the switching power converter, a higher reflected voltage will help to achieve the quasi-resonant operation. Therefore, the switching power converter can be operated in higher switching frequency with a high efficiency for reducing the size of the power transformer. The related prior art can be found in U.S. Pat. No. 7,426,120, entitled "Switching control circuit having a valley voltage detector to achieve soft switching for a resonant power converter". FIG. 1 is a conventional dual switches Flyback power converter. A power transformer 10 includes a primary winding $N_P$ and a secondary winding $N_S$. The primary winding $N_P$ of the power transformer 10 has a first terminal and a second terminal. The secondary winding $N_S$ of the power transformer 10 is coupled to generate an output voltage $V_O$ of the power converter through a rectifier 40 and an output capacitor 45. A first terminal of the secondary winding $N_S$ is coupled to an anode terminal of the rectifier 40. The output capacitor 45 is coupled between a cathode terminal of the rectifier 40 and a second terminal of the secondary winding $N_S$.

A high-side transistor 20 is connected from an input voltage $V_{IN}$ to the first terminal of the primary winding $N_P$. A positive terminal of an electrolytic capacitor 50 is connected to the input voltage $V_{IN}$ and a negative terminal of the electrolytic capacitor 50 is connected to a ground. A low-side transistor 30 is connected from the second terminal of the primary winding $N_P$ to the ground. A first diode 35 is connected from the second terminal of the primary winding $N_P$ to the input voltage $V_{IN}$. A second diode 25 is coupled from the ground to the first terminal of the primary winding $N_P$.

A low-side switching signal $S_1$ is coupled to drive the low-side transistor 30 and a high-side switching signal $S_2$ is coupled to drive the high-side transistor 20. When the transistors 20 and 30 are switched off simultaneously, the energy stored in the leakage inductor (not shown in the figure) of the power transformer 10 (the primary winding $N_P$) will be recycled to the electrolytic capacitor 50 through the diodes 25 and 35 for power saving. Furthermore, a reflected voltage of the power transformer 10 will be generated across the primary winding $N_P$ when the transistors 20 and 30 are switched off. The reflected voltage is correlated to the output voltage $V_O$ and the turn ratio $N_P/N_S$ of the power transformer 10. If the reflected voltage is higher than the input voltage $V_{IN}$, the energy stored in the power transformer 10 will be discharged to the electrolytic capacitor 50 instead of delivering to the output voltage $V_O$ when the transistors 20 and 30 are turned off. The drawback for this power converter shows that the output voltage $V_O$ will decrease when the input voltage $V_{IN}$ is lower than the reflected voltage.

SUMMARY OF THE INVENTION

The objective of the present invention is to allow the power converter being operated in a wide input voltage range.

Another objective of the present invention is to allow the power transformer having a higher reflected voltage.

The present invention is a dual switches Flyback power converter with a wide input voltage range. The power converter according to the present invention comprises an input diode and an energy-storage capacitor. The input diode prevents the reflected voltage from the power transformer of the power converter to charge the electrolytic capacitor of the power converter. The energy-storage capacitor will store the reflected voltage and the energy of the leakage inductor of the power transformer. The energy stored in the energy-storage capacitor will be recycled to the output voltage of the power converter. Further, the input diode can be replaced by an input transistor to prevent the reflected voltage from the power transformer to charge the electrolytic capacitor.

DESCRIPTION OF THE EXEMPLARY EMBODIMENTS

Figure 1:
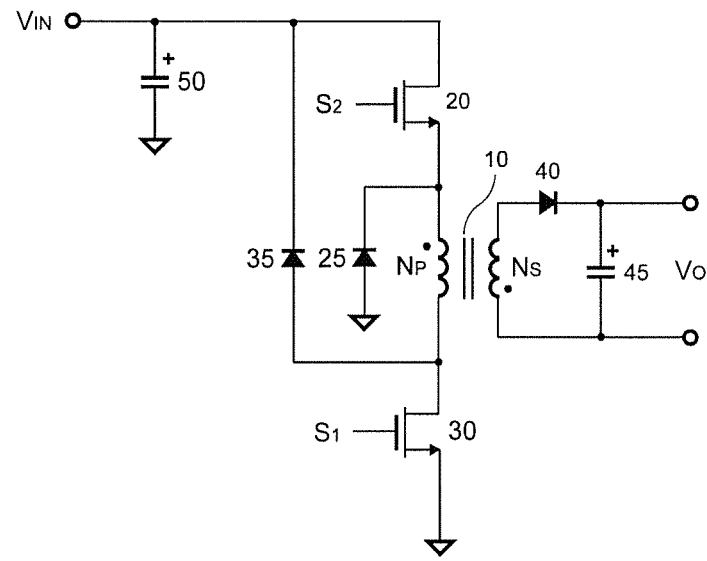
FIG. 1 is a conventional dual switches Flyback power converter.
Figure 2:
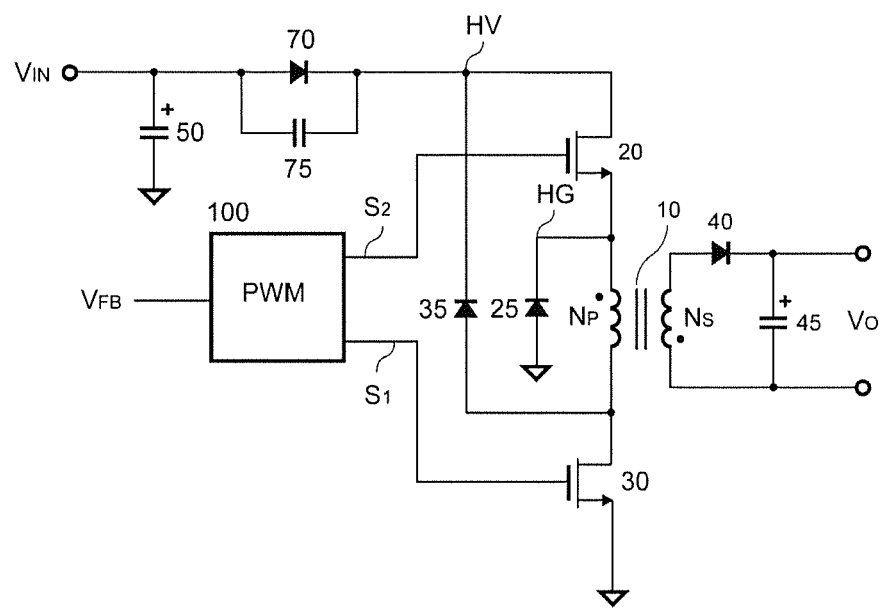
FIG. 2 is a preferred embodiment of the dual switches Flyback power converter according to the present invention.

FIG. 2 shows a preferred embodiment of the dual switches Flyback power converter according to the present invention. The dual switches Flyback power converter can be served as a dual switches power converter with a wide input voltage range. An input diode 70 is coupled from the input voltage $V_{IN}$ of the power converter to a HV terminal. The HV terminal is a high voltage terminal. The HV terminal is further coupled to a high-side transistor 20. A power transformer 10 includes a primary winding $N_P$ and a secondary winding $N_S$. The secondary winding $N_S$ of the power transformer 10 is coupled to generate an output voltage $V_O$ of the power converter through a rectifier 40 and an output capacitor 45. A first terminal of the secondary winding $N_S$ is coupled to an anode terminal of the rectifier 40. The output capacitor 45 is coupled between a cathode terminal of the rectifier 40 and a second terminal of the secondary winding $N_S$.

The primary winding $N_P$ of the power transformer 10 has a first terminal and a second terminal. The high-side transistor 20 is connected from the HV terminal to the first terminal of the primary winding $N_P$. A low-side transistor 30 is connected from the second terminal of the primary winding $N_P$ to the ground. The first diode 35 is connected from the second terminal of the primary winding $N_P$ to the HV terminal. The second diode 25 is coupled from the ground to the first terminal of the primary winding $N_P$. The input diode 70 prevents the reflected voltage from the power transformer 10 to charge the electrolytic capacitor 50.

An energy-storage capacitor 75 is connected to the input diode 70 in parallel to store the reflected voltage and the energy of the leakage inductor (not shown in the figure) of the power transformer 10. The energy-storage capacitor 75 is smaller than the electrolytic capacitor 50. The energy-storage capacitor 75 will further be charged by a differential voltage if the reflected voltage is higher than the input voltage $V_{IN}$. The energy stored in the energy-storage capacitor 75 will be recycled to the output voltage $V_O$ through the switching of the power transformer 10. The switching-control circuit (PWM) 100 receives a feedback voltage $V_{FB}$ to generate a low-side switching signal $S_1$ and a high-side switching signal $S_2$ to drive the low-side transistor 30 and the high-side transistor 20 respectively, The feedback voltage $V_{FB}$ is coupled to the output voltage $V_O$ of the power converter. The high-side transistor 20 and the low-side transistor 30 are turned on/off simultaneously to switch the power transformer 10.

Figure 3:
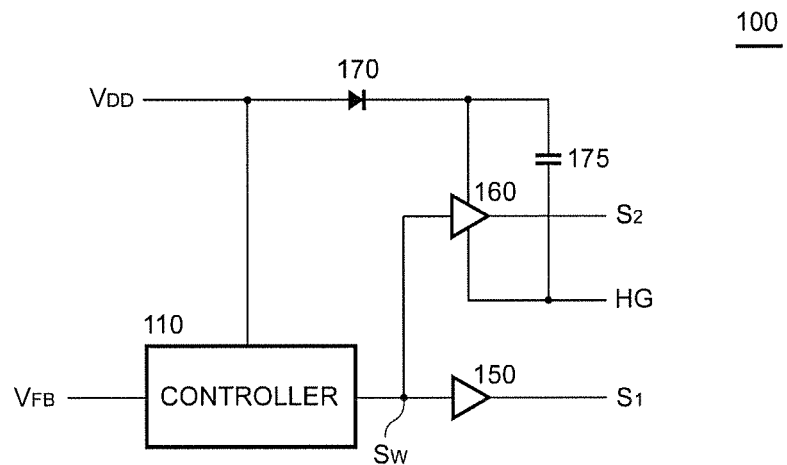
FIG. 3 is a preferred embodiment of the switching-control circuit according to the present invention.

FIG. 3 shows a preferred embodiment of the switching-control circuit 100 according to the present invention. The switching-control circuit 100 includes a PWM controller (CONTROLLER) 110, a low-side drive circuit 150 and a high-side drive circuit 160. The PWM controller 110 receives the feedback voltage $V_{FB}$ to generate a switching signal $S_W$. The feedback voltage $V_{FB}$ is coupled to the output voltage $V_O$ (shown in FIG. 2) of the power converter. That is, the switching-control circuit 100 is coupled to the output voltage $V_O$ of the power converter to generate the switching signal $S_W$ for regulating the power converter.

The low-side drive circuit 150 generates the low-side switching signal $S_1$ coupled to a gate terminal of the low-side transistor 30 (shown in FIG. 2) to drive the low-side transistor 30 in response to the switching signal $S_W$. The high-side drive circuit 160 generates the high-side switching signal $S_2$ coupled to a gate terminal of the high-side transistor 20 (shown in FIG. 2) to drive the high-side transistor 20 in response to the switching signal $S_W$. Therefore, the switching signal $S_W$ is coupled to the drive the high-side transistor 20 and the low-side transistor 30. The high-side transistor 20 and the low-side transistor 30 are turned on/off simultaneously.

A ground terminal HG of the high-side drive circuit 160 is connected to a source terminal of the high-side transistor 20 and the first terminal of the primary winding $N_P$ (shown in FIG. 2). A charge-pump circuit developed by a diode 170 and a capacitor 175 provides a power supply to drive the high-side transistor 20 in response to a supply voltage $V_{DD}$ generated by the PWM controller 110. An anode terminal of the diode 170 is coupled to the supply voltage $V_{DD}$. The capacitor 175 is coupled between a cathode terminal of the diode 170 and the ground terminal HG of the high-side drive circuit 160. A joint of the capacitor 175 and the cathode terminal of the diode 170 is coupled to the high-side drive circuit 160 to provide the power supply.

Figure 4:
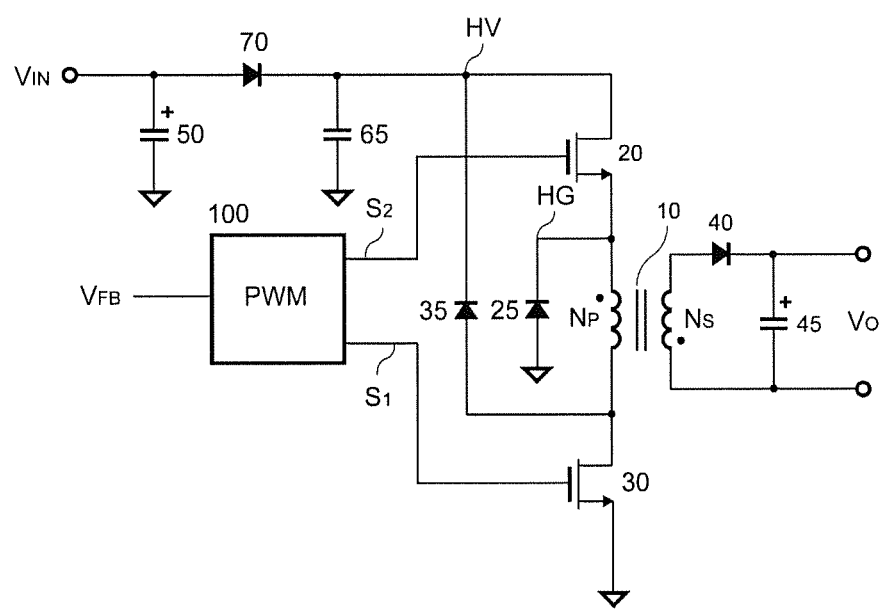
FIG. 4 is a second preferred embodiment of the dual switches Flyback power converter according to the present invention.

FIG. 4 shows a second preferred embodiment of the dual switches Flyback power converter according to the present invention. The dual switches Flyback power converter can be served as a switching power converter with a wide input voltage range. This preferred embodiment is similar to the circuit shown in FIG. 2, except the energy-storage capacitor 75 is neglected. An energy-storage capacitor 65 is coupled from the HV terminal, a joint of the input diode 70 and a drain terminal of the high-side transistor 20, to the ground. The first diode 35 is connected from the second terminal of the primary winding $N_p$ to the energy-storage capacitor 65. The energy-storage capacitor 65 is also smaller than the electrolytic capacitor 50. The energy-storage capacitor 65 will store the reflected voltage and the energy of the leakage inductor (not shown in the figure) of the power transformer 10. The energy stored in the energy-storage capacitor 65 will be recycled to the output voltage $V_O$ through the switching of the power transformer 10.

Figure 5:
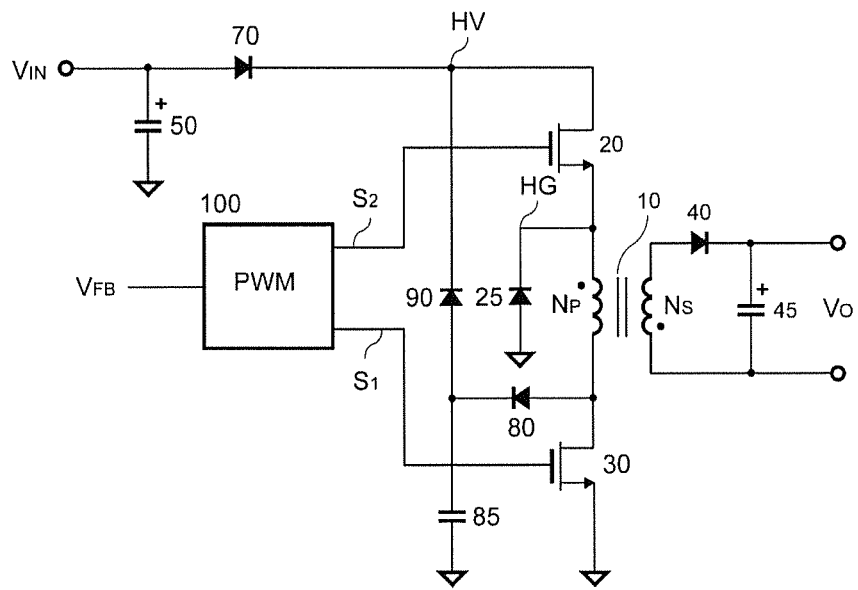
FIG. 5 is a third preferred embodiment of the dual switches Flyback power converter according to the present invention.

FIG. 5 shows a third preferred embodiment of the dual switches Flyback power converter according to the present invention. The dual switches Flyback power converter can be served as a Flyback power converter with a wide input voltage range. This preferred embodiment also includes the power transformer 10, the input diode 70, the high-side transistor 20, the low-side transistor 30, the second diode 25, the electrolytic capacitor 50 and the switching-control circuit 100. The input diode 70 is coupled from the input voltage $V_{IN}$ of the power converter to the HV terminal. The HV terminal is further coupled to the drain terminal of the high-side transistor 20. The power transformer 10 includes the primary winding $N_P$ and the secondary winding $N_S$. The primary winding $N_P$ of the power transformer 10 has the first terminal and the second terminal.

The high-side transistor 20 is coupled from the HV terminal to the first terminal of the primary winding N. The low-side transistor 30 is coupled from the second terminal of the primary winding $N_P$ to the ground. The second diode 25 is served as a low-side diode coupled from the ground to the first terminal of the primary winding $N_P$. The electrolytic capacitor 50 is connected from the input voltage $V_{IN}$ to the ground. The switching-control circuit 100 receives the feedback voltage $V_{FB}$ to generate the low-side switching signal $S_1$ and the high-side switching signal $S_2$ to drive the low-side transistor 30 and the high-side transistor 20 respectively.

A first high-side diode 80 is connected from the second terminal of the primary winding $N_p$ to a first terminal of an energy-storage capacitor 85. A second terminal of the energy-storage capacitor 85 is coupled to the ground. The energy-storage capacitor 85 is smaller than the electrolytic capacitor 50. The first terminal of the energy-storage capacitor 85 is coupled to the HV terminal via a second high-side diode 90, that is to say, the second high-side diode 90 is coupled from the first terminal of the energy-storage capacitor 85 to the HV terminal. The input diode 70 prevents the reflected voltage from the power transformer 10 to charge the electrolytic capacitor 50. The energy-storage capacitor 85 stores the reflected voltage and the energy of the leakage inductor (not shown in the figure) of the power transformer 10. The energy stored in the energy-storage capacitor 85 will be recycled to the output voltage $V_o$ through the second high-side diode 90 and the switching of the power transformer 10. The circuits shown in FIG. 3 and FIG. 4 will also provide a better EMI performance.

Figure 6:
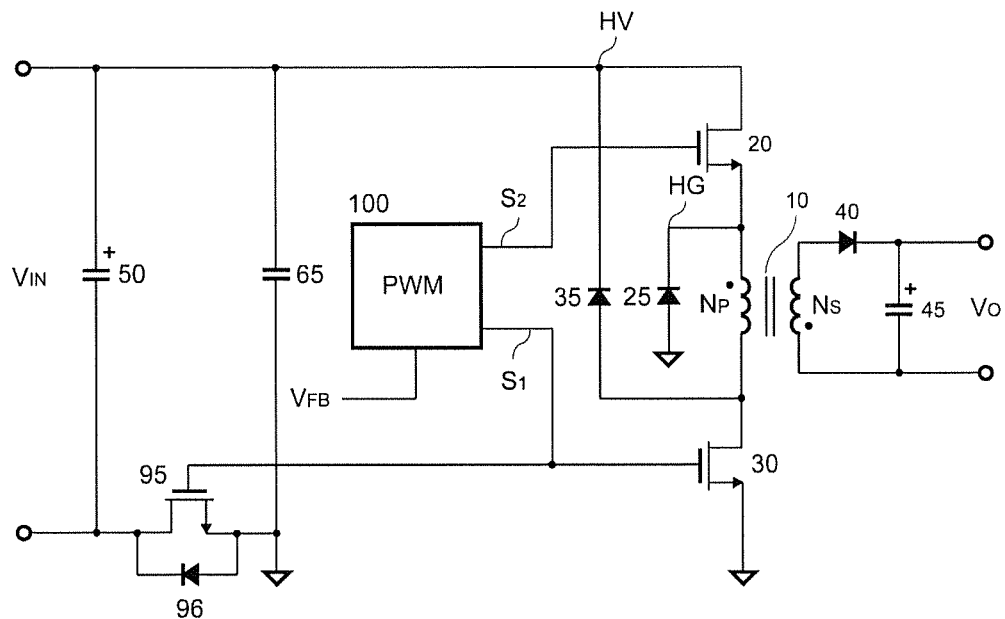
FIG. 6 is a fourth preferred embodiment of the dual switches Flyback power converter with a wide input voltage range according to the present invention.

FIG. 6 shows a fourth preferred embodiment of the dual switches Flyback power converter with a wide input voltage range according to the present invention. By comparing with FIG. 4, FIG. 6 discloses another dual switches Flyback power converter, which uses an input transistor 95 with a parasitic diode 96 instead of the input diode 70 shown in FIG. 4. The energy-storage capacitor 65 is coupled from the HV terminal to the ground. A first terminal of the energy-storage capacitor 65 is coupled to the HV terminal and a second terminal of the energy-storage capacitor 65 is coupled to the ground. The HV terminal is further coupled to the drain terminal of the high-side transistor 20. The high-side transistor 20 is coupled from the first terminal of the energy-storage capacitor 65 and the HV terminal to the first terminal of the primary winding $N_p$.

A drain terminal of the input transistor 95 is coupled to the negative terminal of the electrolytic capacitor 50. The low-side switching signal $S_1$ is coupled to control a gate terminal of the input transistor 95 to turn on/off the input transistor 95. Therefore, the input transistor 95 is driven by the switching signal $S_W$ shown in FIG. 3. The high-side transistor 20, the low-side transistor 30 and the input transistor 95 are turned on/off simultaneously. The input transistor 95 has a source terminal coupled to the ground. That is, the input transistor 95 is coupled from the input voltage $V_{IN}$ of the power converter to the second terminal of the energy-storage capacitor 65. Therefore, the input transistor 95 has the parasitic diode 96 for preventing the reflected voltage from the power transformer 10. As mention above, the energy-storage capacitor 65 is also smaller than the electrolytic capacitor 50. The energy-storage capacitor 65 will store the reflected voltage and the energy of the leakage inductor (not shown in the figure) of the power transformer 10. The energy stored in the energy-storage capacitor 65 will be recycled to the output voltage $V_O$ through the switching of the power transformer 10. Further, other circuits of this embodiment are the same as the embodiment of FIG. 4, so here is no need to describe again.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A dual switches power converter with a wide input voltage range, comprising:
    an electrolytic capacitor, coupled to an input voltage of the dual switches power converter;
    an input diode, coupled from the input voltage of the dual switches power converter to a HV terminal for preventing a reflected voltage of a power transformer from charging the electrolytic capacitor;
    an energy-storage capacitor, connected to the input diode in parallel and storing an energy of a leakage inductor of the power transformer;
    a high-side transistor, coupled from the HV terminal to the power transformer;
    a low-side transistor, coupled from the power transformer to a ground;
    a first diode, coupled from the power transformer to the HV terminal;
    a second diode, coupled from the ground to the power transformer; and
    a switching-control circuit, coupled to an output voltage of the dual switches power converter to generate a switching signal for regulating the dual switches power converter;
    wherein the switching signal is coupled to drive the high-side transistor and the low-side transistor.

2. The dual switches power converter as claimed in claim 1, wherein the high-side transistor and the low-side transistor are turned on/off simultaneously.

3. The dual switches power converter as claimed in claim 1, wherein the switching-control circuit comprises a high-side drive circuit and a low-side drive circuit for driving the high-side transistor and the low-side transistor in response to the switching signal, respectively.

4. The dual switches power converter as claimed in claim 1, wherein the switching-control circuit comprises a charge-pump circuit for providing a power supply to drive the high-side transistor.

5. The dual switches power converter as claimed in claim 1, wherein the energy-storage capacitor stores the reflected voltage of the power transformer, the energy stored in the energy-storage capacitor will be recycled to the output voltage through the switching of the power transformer.

6. A switching power converter with a wide input voltage range, comprising:
    an electrolytic capacitor, coupled to an input voltage of the switching power converter;
    an input diode, coupled from the input voltage of the switching power converter to a HV terminal for preventing a reflected voltage of a power transformer from charging the electrolytic capacitor;
    an energy-storage capacitor, coupled from the HV terminal to a ground and storing an energy of a leakage inductor of the power transformer;
    a high-side transistor, coupled from the HV terminal to the power transformer;
    a low-side transistor, coupled from the power transformer to the ground;
    a first diode, coupled from the power transformer to the HV terminal;
    a second diode, coupled from the ground to the power transformer; and
    a switching-control circuit, coupled to an output voltage of the switching power converter to generate a switching signal for regulating the switching power converter;
    wherein the switching signal is coupled to drive the high-side transistor and the low-side transistor.

7. The switching power converter as claimed in claim 6, wherein the high-side transistor and the low-side transistor are turned on/off simultaneously.

8. The switching power converter as claimed in claim 6, wherein the switching-control circuit comprises a high-side drive circuit and a low-side drive circuit for driving the high-side transistor and the low-side transistor in response to the switching signal, respectively.

9. The switching power converter as claimed in claim 6, wherein the switching-control circuit comprises a charge-pump circuit for providing a power supply to drive the high-side transistor.

10. The switching power converter as claimed in claim 6, wherein the energy-storage capacitor stores the reflected voltage of the power transformer, the energy stored in the energy-storage capacitor will be recycled to the output voltage through the switching of the power transformer.

11. A Flyback power converter with a wide input voltage range, comprising:
    an electrolytic capacitor, coupled to an input voltage of the flyback power converter;
    an input diode, coupled from the input voltage of the flyback power converter to a HV terminal for preventing a reflected voltage of a power transformer from charging the electrolytic capacitor;
    a high-side transistor, coupled from the HV terminal to the power transformer;
    a low-side transistor, coupled from the power transformer to a ground;
    a low-side diode, coupled from the ground to the power transformer;
    an energy-storage capacitor, coupled to the ground and storing an energy of a leakage inductor of the power transformer;
    a first high-side diode, coupled from the power transformer to the energy-storage capacitor;
    a second high-side diode, coupled from the energy-storage capacitor to the HV terminal; and a switching-control circuit, coupled to an output voltage of the flyback power converter to generate a switching signal for regulating the flyback power converter;

wherein the switching signal is coupled to drive the high-side transistor and the low-side transistor.

12. The flyback power converter as claimed in claim 11, wherein the high-side transistor and the low-side transistor are turned on/off simultaneously.

13. The flyback power converter as claimed in claim 11, wherein the switching-control circuit comprises a high-side drive circuit and a low-side drive circuit for driving the high-side transistor and the low-side transistor in response to the switching signal, respectively.

14. The flyback power converter as claimed in claim 11, wherein the switching-control circuit comprises a charge-pump circuit for providing a power supply to drive the high-side transistor.

15. The flyback power converter as claimed in claim 11, wherein the energy-storage capacitor stores the reflected voltage of the power transformer, the energy stored in the energy-storage capacitor will be recycled to the output voltage through the second high-side diode and the switching of the power transformer.

16. A dual switches Flyback power converter with a wide input voltage range, comprising:
    an energy-storage capacitor, coupled from a HV terminal to a ground;
    an input transistor, coupled from an input voltage of the dual switches flyback power converter to the energy-storage capacitor for preventing a reflected voltage of a power transformer from charging an electrolytic capacitor;
    a high-side transistor, coupled from the energy-storage capacitor and the HV terminal to the power transformer;
    a low-side transistor, coupled from the power transformer to the ground;
    a first diode, coupled from the power transformer to the energy-storage capacitor;
    a second diode, coupled from the ground to the power transformer; and
    a switching-control circuit, coupled to an output voltage of the dual switches flyback power converter to generate a switching signal for regulating the dual switches flyback power converter;
    wherein the switching signal is coupled to drive the high-side transistor, the low-side transistor and the input transistor.

17. The dual switches flyback power converter as claimed in claim 16, wherein the high-side transistor, the low-side transistor and the input transistor are turned on/off simultaneously.

18. The dual switches flyback power converter as claimed in claim 16, wherein the switching-control circuit comprises a high-side drive circuit and a low-side drive circuit for driving the high-side transistor and the low-side transistor in response to the switching signal, respectively, and a charge-pump circuit for providing a power supply to drive the high-side transistor.

19. The dual switches flyback power converter as claimed in claim 16, wherein the input transistor has a parasitic diode for preventing the reflected voltage from the power transformer.

20. The dual switches flyback power converter as claimed in claim 16, wherein the energy-storage capacitor stores the reflected voltage from the power transformer and an energy of a leakage inductor of the power transformer, the energy stored in the energy-storage capacitor will be recycled to the output voltage through the switching of the power transformer.

* * * * *